United States Patent [19]

Feinberg et al.

[11] 4,224,393

[45] Sep. 23, 1980

[54] BATTERY SEPARATOR

[75] Inventors: Stewart C. Feinberg, Columbia; Christian B. Lundsager, Ashton; Joseph T. Lundquist, Jr., Columbia; Robert A. Balouskus, Sykesville, all of Md.

[73] Assignee: W. R. Grace & Co., New York, N.Y.

[21] Appl. No.: 38,007

[22] Filed: May 10, 1979

[51] Int. Cl.³ ............................................. H01M 2/16
[52] U.S. Cl. .................................... 429/251; 429/254
[58] Field of Search ................................ 429/254, 251

[56] References Cited

U.S. PATENT DOCUMENTS

| | | | |
|---|---|---|---|
| 3,161,547 | 12/1964 | Beaulieu | 429/254 X |
| 3,351,495 | 11/1967 | Larsen et al. | 429/252 |
| 3,585,081 | 6/1971 | Mirman | 429/254 X |
| 3,875,270 | 4/1975 | Hoefner et al. | 429/254 X |
| 3,967,978 | 7/1976 | Honda et al. | 429/254 |
| 4,085,241 | 4/1978 | Sheibley | 429/254 X |

*Primary Examiner*—Charles F. LeFevour
*Attorney, Agent, or Firm*—Howard J. Troffkin; William W. McDowell, Jr.

[57] ABSTRACT

A battery separator, and a method of forming the same, which exhibits good electrical conductivity and a high degree of inhibition to dendrite formation, is in the form of a thin sheet formed from a substantially uniform mixture of a thermoplastic rubber and a filler in a volume ratio of from about 1:0.15 to 1:0.6. The thermoplastic rubber is preferably a styrene/elastomer/styrene block copolymer.

7 Claims, No Drawings

BATTERY SEPARATOR

BACKGROUND OF THE INVENTION

The subject invention is directed to battery separators which exhibit a high degree of conductivity and inhibition to dendrite formation and which are capable of being formed in an economically improved manner.

Storage batteries, in general, utilize either acid or alkaline electrolyte with compatible electrode systems. The term "acid battery system" or "alkaline battery system," used in the present application, refers to battery systems which utilize, respectively, an acidic or an alkaline solution as the electrolyte. An example of an acid battery system is lead acid batteries which are in common use, while examples of alkaline battery systems are those which use silver-cadmium or nickel-zinc electrodes in an alkaline solution such as an aqueous solution of potassium hydroxide.

Because of their high energy density, alkaline batteries, such as nickel-zinc secondary alkaline battery system, have great potential for replacing the more conventional lead acid battery system in a number of terrestrial applications. However, extending the cyclic life of the battery beyond that presently attainable and reducing the cost of the cell components are required criterias which must be met to make the alkaline battery system an effective energy source.

Battery separators are recognized as a key component in attaining an extended battery life and efficiency. Separators are located between plates of opposite polarity to prevent contact between the plates while freely permitting electrolytic conduction. Contact between plates of opposite polarity may be due to imperfections in the plate structure, such as warping or wrinkling of the plate. Such macro deformations are readily inhibited by any type of a sheet material which is coextensive with the plates and is capable of permitting suitable eletrolyte passage. Contact may also occur by formation of dendrites or localized needle like growths on an electrode, such as zinc dendrites formed on the zinc electrode in an alkaline nickel-zinc battery system. Separators which are commonly used today are in the form of sheet structures which during formation normally have pores and imperfections of sufficient size to readily permit dendrites to bridge the gap between electrodes of opposite polarity and, thereby, short out the battery system and reduce the battery life.

Various non-elastomeric polymers have been used for forming separators. The term "elastomeric" or "elastomer," or "rubber," as used in the present application, refers to polymer materials which are capable of exhibiting a high degree of elongation and recovery. Elastomeric materials are distinguished from other polymeric materials, such as polyethylene, polypropylene, polystyrene and the like which are not capable of exhibiting such stress/strain recovery properties.

U.S. Pat. No. 3,351,495 teaches that certain non-elastomeric polyolefins, such as polyethylene and polypropylene, can be compounded with filler and plasticizer to form a sheet material which, after extraction of some or all plasticizer, forms a microporous matrix suitable as a battery separator. The required use of a high amount of plasticizer and the needed extraction step to form a suitable separator material is costly and, in certain instances, produces irregular results. Separators formed from polyolefins, such as polyethylene, have been irradiated in attempts to increase the structural integrity of the formed sheet material. The resultant crosslinked material, when used as a separator, have been observed to exhibit high electrical resistance and, therefore, generally detract from the formation of effective and efficient battery system.

More recently, certain rubber materials, including synthetic rubbers, have been used in the preparation of battery separators. These rubber materials are solvent cast onto a highly porous substrate support sheet which is normally formed from cellulose or asbestos material. The process of forming such composite separators is both complex and costly and requires removal of the casting solvent and extraction of plasticizer contained in the rubber to form a microporous membrane. Further, these separators are normally of a thickness which reduces the efficiency of the formed battery system.

A battery separator which is capable of increasing the efficiency of a battery system is highly desired. It is generally agreed such a separator should be in the form of a thin, microporous sheet which is resistant to degradation by electrolyte solution, exhibits a high degree of inhibition to dendrite formation and dendrite growth, and has a high degree of electrical conductivity. Further, the battery separator should be of a composition which is capable of being processsed and formed into thin microporous sheet material in an efficient and cost effective means.

SUMMARY OF THE INVENTION

The present invention is directed to battery separators which have high electrical conductivity, high inhibition to dendrite formation and growth, are resistant to degradation by common electrolyte solutions, and is readily formed in a cost effective, simple manner. The present separator is formed from a substantially uniform mixture of a thermoplastic rubber material, preferably a styrene/elastomer/styrene triblock copolymer and a filler which is essentially chemically inert to the electrolyte of the battery system. The volume ratio of the thermoplastic rubber to filler is from 1:0.15 to 1:0.6. The mixture is capable of being formed into sheets of less than 10 mil thickness of a structure which permits good electrical conductivity and high inhibition to dendrite formation and growth.

DETAILED DESCRIPTION OF THE INVENTION

The subject invention is directed to the utilization of a combination of components which unexpectedly permits the formation of a battery separator having highly desired properties in a simple, cost effective manner. Further, the presently described invention is directed to a process which forms an integral sheet product in a simple, cost effective manner.

The required components to be used in forming the subject separator are a thermoplastic rubber material in combination with an inert filler such that the volume ratio of thermoplastic rubber to filler is from 1:0.15 to 1:0.6 and, preferably, from 1:0.25 to 1:0.4. It has been unexpectedly found that when one utilizes a thermoplastic rubber material, as more fully described herein below, in a combination with an inert filler in the particular volume ratio described herein, one is capable of forming a homogeneous mixture which can be processed by standard techniques and equipment to form the desired sheet material suitable as a battery separator. The composition of the present invention does not require the utilization of a plasticizer, oil or other such additives to aid in the processing of the subject composition.

The polymer matrix required for use in forming the subject separators are of the class of materials known as thermoplastic rubbers. The polymers are required to have an elastomeric segment which forms the major amount of the polymer chain. The elastomeric material generally has a glass transition temperature below room temperature and is substantially amorphous in morphology. The polymer chain further comprises a thermoplastic segment which has a glass transition temperature above 75° C. and, preferably, above 100° C., and which forms a minor portion of the polymeric chain. The thermoplastic segments normally form end blocks of the polymer chain. The material can, therefore, be viewed as a block copolymer having a structure of thermoplastic/elastomer/thermoplastic polymer chains. Examples of such polymer materials formed of three block segments which an elastomeric block in the center of the polymeric chain and a thermoplastic block on each end are, for example, styrene/elastomer/styrene block copolymer. Such thermoplastic rubbers are commercially available, including materials sold under the tradename of Kraton by Shell Chemical Company.

The thermoplastic rubbers found useful in the present invention consist of triblock copolymers in which the mid-block of the molecule is an elastomer such as polybutadiene, isoprene, poly(ethylene-butylene) and the like. The mid-block segment should be present as the major volume percent of the triblock copolymer and have an average molecular weight which is sufficient to impart elastomeric rubber properties to the resultant copolymer. Such molecular weights are normally at least about 40,000. Elastomers of an average molecular weight of from about 40,000 to 100,000 are most suitable for the intended purpose.

The thermoplastic blocks form segments at each end of the elastomeric block to complete the triblock configuration of the subject thermoplastic rubber. The preferred thermoplastic rubbers have end blocks formed from styrene. In lieu of styrene, the end blocks can be formed from other vinyl monomers which are capable of forming polymer segments which are thermodynamically incompatible with the elastomer segment while capable of imparting thermoplastic properties to the resultant rubber. Other monomers suitable for forming the end blocks include substituted styrene, such as alpha-methyl styrene, paraphenyl styrene, as well as acrylonitrile and the like. The thermoplastic polymeric end groups should have a glass transition temperature of above about 75° C. and preferably above about 100° C. Each of the end blocks should have an average molecular weight between a lower limit set by the minimum chain size required for phase separation, while the upper limit is governed by the effect of viscosity on the efficiency of phase separation. In most instances, the average molecular weight of such end blocks are from about 5,000 to 25,000 and, preferably, from 10,000 to 20,000. In the case of polystyrene end blocks, it is preferred that the styrene content be up to about 40 volume percent of the triblock copolymer, as described herein.

The preferred thermoplastic rubbers to be used in the present invention are those of a block copolymer formed from styrene/elastomer/styrene wherein the elastomer is butadiene, isoprene or ethylene/butylene copolymers. The polystyrene concentration may range from about 15% to about 40% by weight such as to give the resultant polymer thermoplastic properties while allowing the polymer to retain the elastomeric properties attributable to the mid-block.

The thermoplastic rubber found useful in the subject invention have a melt index, as determined by the standard procedures indicated in ASTM D-1238 (Condition G), of less than about 10 gms/10 min, and have tensile strengths of from about 3,000 to 5,000 psi, 300% modulus of elasticity of from about 10 to 900 psi, and elongation at break of from about 500 to 1,300 percent, as measured in accordance with ASTM method D-412.

The thermoplastic rubbers, as illustrated by styrene/elastomer/styrene, are generally prepared by anionic polymerization, preferably anionic solution polymerization using solvents, initiators, temperatures, and techniques which are well known to those skilled in the art. Four methods used for preparing block copolymers by anionic polymerization are applicable to preparing the thermoplastic elastomers used in this invention and are summarized as follows:

1. Sequential Polymerization

Styrene is first polymerized in preferably non-polar solvents, such as heptane or cyclohexane, using suitable alkyl lithium initiators, such as sec-butyl lithium or isopropyl lithium. After all the styrene has been polymerized, the elastomeric block may be initiated from the end of styrene block by addition of a suitable elastomer forming monomer, such as butadiene. In order to initiate the third (polystyrene) block after the elastomer has been consumed, a polar solvent must be added along with styrene. This method can be used in the preparation of triblock copolymer free of any homopolymer or diblock, provided rigorous exclusion of impurities is observed.

2. Difunctional Initiation

Polymerization of the desired elastomer, such as butadiene, is initiated by means of a dilithium initiator. Styrene monomer is added after formation of polystyrene blocks at each end of the elastomer.

3. Diblock Synthesis

A polystyrene-diene diblock copolymer is prepared in a manner similar to that described in Method 1 above. The active chain ends are then coupled using a coupling agent (e.g., dichlorodimethyl silane) to yield triblock material.

4. Two-Stage Process

Polystyrene is formed and followed by addition of a styrene-diene mixture whereby the elastomeric block is formed preferentially, followed by the polystyrene block.

Although not to be a limitation on the subject invention, it is believed that the thermoplastic rubbers of the subject invention, as illustrated by styrene/elastomer/styrene block copolymers, are capable of exhibiting both thermoplastic and elastomeric properties due to the thermodynamic incompatability between the polystyrene thermoplastic moieties and the elastomer blocks contained in the rubber molecule and matrix. Because of this incompatibility, the polystyrene end blocks, being in a minor portion of the rubber matrix, unite to form submicroscopic regions or domains (about 300 to 400 Angstroms) which are substantially uniformly distributed throughout the matrix. These domains create a crosslinking network of a physical nature. The continuous phase between and around the domains is occupied by the elastomeric moieties and imparts the rubber properties to the polymer material. The domains may be disrupted and, therefore, the physical crosslinking may be readily broken through the application of stress or elevated temperature or a combination of the same, and will depend upon the exact glass transition temperature of the resultant thermoplastic polymer. The subject thermoplastic rubbers have or exhibit two glass transition temperatures, one associated predominantly with the elastomeric moiety, and a second associated with the thermoplastic end blocks. For comparison, random copolymers of styrene and butadiene normally exhibit a single glass transition temperature.

The subject rubbers may be further enhanced by incorporating therewith an antioxidant, an antiozonant, as well as other conventional additives or combinations thereof in conventional amounts and methods as is well known to those skilled in the art. Some antioxidants which have been found useful with respect to thermoplastic rubbers are, for example, zinc dibutyl dithiocarbamate, thiodipropionate, triphenyl phosphite and the like. Antiozonants, which are commercially available, include, for example, nickel dibutyldithiocarbamate, dibutylthiourea and the like.

It has been found that the above described polymer matrix when utilized in combination with filler materials, as described herein below, forms a unique composition which is capable of forming a sheet material suitable for use as a battery separator. The filler materials should be substantially chemically inert with respect to the specific electrolyte solution with which it is contemplated the separator will come in contact. Generally, the size of the filler particle can range from an average of about 0.01 micron to about 10 microns in diameter and, preferably, from about 0.01 to 0.25 microns. The surface area of the filler can range from about 10 to 950 square meters per gram, as determined by standard techniques.

The fillers may be any ingredient which is substantially chemically inert with respect to the electrolyte to which it is to come in contact. For example, the filler can be carbon black, coal dust, or graphite; it may also be a metal oxide or hydroxide such as those of silicon, aluminum, calcium, magnesium, barium, titanium, iron, zinc, and tin; it may also be a metal carbonates such as those of calcium, magnesium or the like; synthetic and natural zeolites; Portland cement; precipitated metal silicates, such as calcium silicate, and aluminum polysilicate; alumina and silica gels, or mixtures of said fillers.

When the separator material is contemplated for use as a component of an alkaline battery system, it is preferred that the filler material utilized by aluminum oxide, magnesium oxide, titanium dioxide, carbon, or combinations thereof. If the battery separator is contemplated for use as a component of an acid battery system, the filler material may include silicon compounds, such as silicon oxide, silica gels, polysilicates, and the like. The volume ratio of polymer to filler should be between 1:0.15 and 1:06 and, preferably, between 1:0.25 to 1:04. It has been found that by utilizing a polymer to filler volume ratio, as described herein above, the components will form a uniform mixture which is capable of being processed to a battery separator sheet without the aid of additional components, such as plasticizers, oil extenders, and the like at levels which require extraction. Therefore, the present composition is capable of forming a battery separator without the conventional process step of extracting or removing the plasticizers or oils subsequent to forming of the sheet product.

The above described thermoplastic rubber-filler composition may be mixed with minor amounts of such organic additives which further improve its thermoplastic or viscoelastic properties, or a combination thereof. The additional material should be present in amounts of not greater than 10 percent by weight, based on the total weight of the resultant composition. In order to further enhance the viscoelastic properties of the subject thermoplastic rubber, one may utilize an additional material which will associate with the elastomeric phase of the matrix. The thermoplastic or high temperature performance of the rubber may be modified by ingredients which will associate with the thermoplastic phase or domains of the matrix. For example elastomer associated materials are organic compounds and low molecular weight polymers having a softening point of less than about 75° C., and which include low molecular weight polyisobutylene, polybutadiene, polypropylene, ethylene-propylene copolymers, poly(vinyl acetate), ethylene-vinyl acetate copolymers, polyterpene, as well as esters, polyesters, and the like. The thermoplastic properties of the subject polymer can be modified by the addition of compounds which will associate with the thermoplastic moiety, such as polystyrene, poly(alpha-methylstyrene), and the like.

The components of the instant composition can be mixed by any conventional manner which will produce a substantially uniform distribution of the filler throughout the polymer matrix. Mixing temperatures of up to about 175° C. and preferably, from about 70° to 150° C. are suitable for processing the compounds to be utilized in the instant invention. At such elevated temperatures, the polymeric matrix is softened sufficiently to be handled as a thermoplastic material. To produce a particularly uniform mixture, the components can be premixed at room temperature in a blender or the like, and then fed to a heated mixer, such as an internal mixer of the Banbury type or the like which are suitable compounding processors.

After being substantially uniformly mixed, the resultant composition can be molded or shaped by any conventional manner, such as, for example, by utilizing extrusion, injection molding, or compression molding apparatus to form the final sheet product. The shaping can be readily done by utilizing elevated temperature, pressure or shear force or a combination thereof. The exact temperature or force will depend on the particular composition used, as well as the particular shaping process used, and can be determined by standard techniques. Temperatures, as described above with respect to mixing, have been found most suitable in shaping the subject material. It has been found that the composition described herein readily forms a sheet material suitable for use as a battery separator merely by mixing the components together under suitable temperature conditons for a time sufficient to produce a substantially uniform mixture, and then shaping the resultant mixture into the desired sheet material.

The term "sheet" is intended in the subject application to define a planar material which may or may not contain, in addition, rib or web members embossing or patterns. The sheet material should be of a film which is generally less than about 10 mils thick and, preferably, less than 7 mils in thickness. The ribs or webs, as part of the configuration of acid battery system separators, may add to this thickness.

It has been unexpectedly found that the sheet material formed in accordance with the present invention can be readily superimposed upon an additional sheet material of like kind so as to form a composite sheet material of less than about 10 mils thick. Due to the nature of subject composition, the resultant films may adhere to one another solely due to the adhesive nature of the materials. Alternatively, composite sheet material can be formed by subjecting the sheets to sufficient elevated temperatures to enhance tackiness of the surface and to pass the combined sheets through a pair of nip rollers or the like. The composite sheet material can be formed from sheets of the same or different thermoplastic rubber matrix. In the former preferred case, the resultant composite sheet will be of a substantially uniform composition throughout the formed separator. By utilizing a multiplicity of the subject sheet materials, one attains a composite sheet which alleviates the effect of pinholes that may occur during the formation of the separator sheet. Such pinholes normally permit ready growth of dendrites and the shorting out of the battery system resulting therefrom.

The final composition of the separator will be substantially the same as and defined by the polymer and filler used to form the initial composition. The resultant sheets formed from such compositions have been found to be substantially absent of pores. Even though the sheet material, as formed, lacks pores, as observed by electron microscopy of the surface and cross-sectioned areas as well as by other conventional techniques, it has been unexpectedly found that they exhibit a high degree of electrical conductivity when in association with an acid or alkaline battery system. Battery separators formed by the above described compositions are believed to inhibit growth of dendrites and the resulting shorting out of the system while permitting a high degree of electrical conductivity by certain physical interaction between the electrolyte and the composition. This interaction, though unresolved, may be in the form of swelling, shrinking, wicking, etc. which causes only minute tortuous pores to form while permitting passage of electrolyte ions.

The thickness of the battery separators will vary, depending upon the type of battery in which they are used. In general, the thickness of web sheet material can range for 1 to 50 mils, as is useful in lead acid batteries systems. For alkaline batteries, the preferred thickness is generally less than about 10 mils thick. The subject composition can be utilized to form both lead acid batteries and alkaline battery separator materials. The lead acid batteries can be made in a combination of a web sheet material to be used alone or in combination with a thin, from about 1 to 10 mils thick, sheet material which aids in forming the tortuous part of the resultant battery separator. For the alkaline battery systems, either a single sheet of material or a plurality of sheets of material can be utilized to form a unitary sheet capable of inhibiting the formation and growth of dendrites between electrodes of opposite plurity.

In order to be commercially acceptable, a battery separator must meet minimum electrical resistant requirements. Generally, the acceptable value is less than about 100 ohm-cm and, preferably, less than 20 ohm-cm, as measured by standard techniques.

Further, the battery separator should possess certain chemical properties such as resistance to oxidation and resistance to attack by acid or alkaline material, as is appropriate for the particular battery separator system. It has been found that the presently formed battery materials are capable of retaining their configuration and are not destroyed when placed in contact with alkali or acid materials over an extended period of time.

The following examples are given for illustrative purposes only and are not meant to be a limitation on the subject invention except as made in the claims appended hereto. All parts and percentages are by weight unless otherwise indicated.

EXAMPLE 1

A battery separator was formed by introducing into a Brabender mixer 44 parts of a commercially available styrene/butadiene/styrene triblock copolymer crumb material which has a 30:70 styrene:butadiene ratio, contains no plasticizer or oil, has a melt index of 1 gm/10 min, Condition G, a Brookfield viscosity (25 wt. % in Toluene) of 4000 at 25° C., and a density of 0.94 gm/cc, with 54 parts a commercial $TiO_2$ powder (DeGusso P-25) having a surface area of 65 $m^2$/gm and a density of 4.3 gm/cc, a rubber modifier of 2 parts of a polyester condensation product of azelaic acid and propanediol (Emergy Industries P-9720), and 0.5 parts of tetra-bis methylene-3-(3,5-ditertiary-butyl-4-hydroxyphenyl)-propionate methane. The materials were mixed at 160° C. at 50 RPM in two passes until a substantially homogeneous mixture was obtained.

Films of the material were formed by pressing small amounts of the resultant formulation in a Walash press at approximately 1,600 psi with both plates of the press being maintained at 145° to 150° C. The resultant film has a thickness of approximately 10 mils and is free of pinholes and imperfections, as observed. Random sections of the surface and cross-sectional area of the resultant film were observed using standard technique of electron microscopy and showed the film to be substantially free of pores.

The films were utilized as separators in nickel-zinc alkaline secondary battery system (electrolyte:KOH). The electrical resistance of the films was determined by the direct current method, as described by J. J. Lander and R. D. Weaver in *Characteristics of Separators for Alkaline Silver Oxide-Zinc Secondary Batteries: Screening Methods*, ed. by J. E. Cooper and A. Fleischer, Chapter 6. Resistance to dendrite penetration was measured according to the method described by G. A. Dalen and F. Solomon, Chapter 12, ibid. Prior to any testing, the films were conditioned by subjection to 45 weight percent KOH solution at 100° C. for 90 minutes. Physical properties of modulus of elasticity ($psi \times 10^{-3}$) and elongation at break (%) of the resultant sheets were tested in accordance with ASTM-638 procedure at an elongation rate of 0.2 in/min and initial jaw separation of 0.4 in. prior to contact with KOH solution and subsequent to soaking in 45 weight percent KOH solution at 80° C. for 96 hours.

In accordance with the above tests procedures, the electrical resistance of the resultant sheet material was determined to be 32 ohm-cm; zinc dendrite resistance was 37.7 min/mil thickness; the modulus of elasticity of blank and KOH treated material was 30 and 22, respectively; and the elongation at break was 790 and 320, respectively.

EXAMPLE II

A battery separator was formed and tested in accordance with the description given in Example I above except that the triblock copolymer used therein was substituted with a commercially available lower molecular weight polymer of styrene/butadiene/styrene crumb material having a 28/72 styrene to butadiene ratio, a melt index (Condition G) of 6, a density of 0.94 gm/cc, a Brookfield viscosity (25 wt. % polymer in Toluene) of 1,200 cps at 25° C., and containing no plasticizer or oil.

The resultant sheet material was approximately 6 mils thick and exhibited electrical resistance of 9.7 ohm-cm and zinc dendrite resistance of 9.1 min/mil.

EXAMPLE III

Separator sheet materials were formed and tested in accordance with the procedures indicated in Example I above. The thermoplastic rubber used was a commercially available styrene/butadiene/styrene triblock copolymer crumb material having a 28/72 styrene to butadiene ratio, a melt index (Condition G) of 6, a density of 0.94 gm/cc and contained no plasticizer or oil. The filler used was a commercially available TiO$_2$ powder (De Gussa P-25) having a surface area of 65 in$^2$/gm and a density of 4.3 gm/cc. Certain of the samples were formulated with a small amount of rubber modifier as indicated in Table I below.

29/71, a density of 0.91, and a Brookfield viscosity (20 wt % in Toluene) of 550. The resultant sheets were all less than 10 mils thick and exhibited the results summarized in Table II.

TABLE II

| Thermoplastic Rubber | Filler TiO$_2$ | Modifier[1] | El. Resist. (ohm-cm) | Dendrite Resist. (min/mil) | Modulus (psi × 10$^{-3}$) | | Elongation (%) | |
|---|---|---|---|---|---|---|---|---|
| | | | | | Blank | KOH | Blank | KOH |
| 35 (SE-BS) | 55 | 10 | 47 | 22 | 6 | 33 | 590 | 30 |
| 35 (SE-BS-1) | 55 | 10 | 26 | 19 | — | — | — | — |
| 40 (SE-BS-1) | 50 | 10 | 36 | 36 | 4 | 60 | 375 | 22 |

[1]Contains 0.5 percent Irganox 1010 antioxidant.

While the invention has been described in connection with certain preferred embodiments, it is not intended to limit the invention to the particular form set forth, but, on the contrary, it is intended to cover such alternatives, modifications, and equivalents as defined by the appended claims.

What is claimed is:

1. A battery separator having high electrical conductivity and inhibition to dendrite formation comprising a substantially uniform sheet formed from a substantially uniform mixture of a thermoplastic rubber and an inert filler having an average particle size of from about 0.01 to 10 microns, the volume ratio of the thermoplastic rubber to filler is from 1:0.15 to 1:0.6 said thermoplastic rubber being a styrene/elastomer/styrene block copolymer having styrene present in from about 15 to 40 weight percent of the copolymer.

TABLE I

| Sample | Thermoplastic Rubber (Parts) | Filler (Parts) | Modifier (Parts) | El. Resist. (ohm-cm) | Dendrite Resist. (min/mil) | Modulus (psi × 10$^{-3}$) | | Elongation (%) | |
|---|---|---|---|---|---|---|---|---|---|
| | | | | | | Blank | KOH | Blank | KOH |
| A | 65 | 35 | — | 39 | 20 | 3.3 | 8.4 | 950 | 540 |
| B | 36 | 64 | — | 12 | 14 | — | — | — | — |
| C | 36 | 64[1] | — | 18 | — | 16 | 56 | 530 | — |
| D | 29 | 63[1] | 10[2] | 56 | — | 44 | 18 | 210 | 20 |
| E | 40 | 45 | 10[3] | 9 | 24 | 4.6 | 14 | 780 | 80 |
| F | 30 | 60 | 10[4] | 49 | 39 | 9.5 | 18 | 560 | 430 |
| G | 44 | 54 | 2[5] | 85 | 27 | 27 | 29 | 100 | 60 |

[1]Two parts are carbon black surface area (N$_2$SA) 230 m$^2$/gm, part. size (E.M.) 30 millimicron.
[2]Ethylene-propylene rubber (Vistalon 404).
[3]High density polyethylene, M.I. =$_2$ O.
[4]Styrene/butadiene/styrene copolymer (Soloprene 416).
[5]Ethylene-vinyl acetate copolymer (25% VA).

EXAMPLE IV

A separator sheet product was formed and tested using the procedure described in Example I above except that the sheet composition was formed from the thermoplastic rubber described in Example II with Al$_2$O$_3$ powder filler having a surface area of 94 m$^2$/gm and a BET Nitrogen pore volume of 0.8 cc/gm. No additional modifiers were used. The sheet product exhibited electrical resistance of 43 ohm-cm, a modulus of elasticity (psi × 10$^{-3}$) of 14 before subjection to KOH solution and 18 after, and elongation at break of 240 both before and after subjection to KOH solution.

EXAMPLE V

Separators were formed using the procedures and test method described in Example I above, except that the thermoplastic rubber used therein was substituted by other commercially available rubbers described herein below. The thermoplastic rubbers used were a styrene-/ethylene-butylene/styrene (SE-BS) block copolymer having a density of 0.91 gm/cc, styrene to rubber ratio of 28 to 72, and a Brookfield viscosity (20 wt % in Toluene) of 1,500; and a lower molecular weight SE-BS polymer (SE-BS-1) having a styrene-rubber ratio of 2. The separator of claim 1 wherein the thermoplastic rubber is selected from styrene/ethylene-butylene/styrene, styrene/isoprene/styrene, or styrene/butadiene/styrene block copolymers or mixtures thereof; said copolymers having a melt index of less than about 10, a number average molecular weight of from about 40,000 to 100,000 for the elastomer, and 10,000 to 20,000 for the styrene.

3. The battery separator of claim 1 or 2 wherein the volume ratio of the thermoplastic rubber to filler is from about 1:0.25 to 1:0.4.

4. The battery separator of claim 1 or 2 wherein the filler is selected from a metal oxide, a metal hydroxide or a metal carbonate.

5. The battery separator of claim 3 wherein the filler is selected from titanium dioxide or aluminum oxide of mixtures thereof.

6. The battery separator of claim 3 wherein the sheet is less than 10 mil thick.

7. The battery separator of claim 6 comprising a laminate structure of multiple layers of said microporous sheet material, said laminate structure having a combined thickness of less than about 10 mil.

* * * * *